(12) United States Patent
Abdo et al.

(10) Patent No.: US 8,140,568 B2
(45) Date of Patent: Mar. 20, 2012

(54) ESTIMATION AND USE OF ACCESS PLAN STATISTICS

(75) Inventors: Abdo Esmail Abdo, Rochester, MN (US); Larry Wayne Loen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 3028 days.

(21) Appl. No.: 10/017,783

(22) Filed: Dec. 13, 2001

(65) Prior Publication Data

US 2003/0115183 A1    Jun. 19, 2003

(51) Int. Cl.
*G06F 17/30* (2006.01)
(52) U.S. Cl. ............... 707/770; 707/706; 707/752
(58) Field of Classification Search ........... 707/1–10, 707/100–104.1, 200–205, 706, 752, 770
See application file for complete search history.

(56) References Cited

U.S. PATENT DOCUMENTS

| | | | |
|---|---|---|---|
| 5,375,177 A | 12/1994 | Vaidyanathan et al. | |
| 5,598,559 A | 1/1997 | Chaudhuri | |
| 5,689,698 A * | 11/1997 | Jones et al. | 707/4 |
| 5,706,495 A | 1/1998 | Chadha et al. | 395/602 |
| 5,734,893 A * | 3/1998 | Li et al. | 707/4 |
| 5,761,653 A | 6/1998 | Schiefer et al. | |
| 5,899,986 A | 5/1999 | Ziauddin | 707/2 |
| 5,933,796 A | 8/1999 | Ashida et al. | |
| 5,995,957 A | 11/1999 | Beavin et al. | 707/2 |
| 6,012,064 A | 1/2000 | Gibbons et al. | |
| 6,029,163 A | 2/2000 | Ziauddin | |
| 6,032,146 A * | 2/2000 | Chadha et al. | 707/6 |
| 6,272,487 B1 | 8/2001 | Beavin et al. | |
| 6,529,901 B1 | 3/2003 | Chaudhuri et al. | |
| 6,725,223 B2 | 4/2004 | Abdo et al. | |
| 6,732,110 B2 | 5/2004 | Rjaibi et al. | |
| 6,738,755 B1 | 5/2004 | Freytag et al. | |
| 6,741,983 B1 | 5/2004 | Birdwell et al. | |

OTHER PUBLICATIONS

U.S. Patent and Trademark Office, Office Action issued in related U.S. Appl. No. 11/930,581, dated Jan. 4, 2010.
U.S. Patent and Trademark Office, FinalOffice Action issued in related U.S. Appl. No. 11/930,581, dated Sep. 7, 2010.

* cited by examiner

*Primary Examiner* — Shahid Alam
(74) *Attorney, Agent, or Firm* — Wood, Herron & Evans LLP

(57) ABSTRACT

In processing a query including a selection criterion on one or more attributes of a relation, a prior statistic generated for a prior different selection criterion on the same one or more attributes of the relation, may be revalidated for use in processing the query, based upon a measure of the entropy of the one or more attributes of the relation. In this way, the revalidation of statistics may be performed more efficiently. Furthermore, attribute groups of a relation for which multidimensional indexes are to be formed, are identified by evaluating the correlation of attribute values within tuples of the relation and determining that the correlation of attribute values within tuples of the relation exceeds a threshold.

8 Claims, 6 Drawing Sheets

ESTIMATION AND USE OF ACCESS PLAN STATISTICS

FIELD OF THE INVENTION

This invention generally relates to a database management system performed by computers.

BACKGROUND OF THE INVENTION

Statistics are frequently accumulated to describe data in a database, to facilitate accesses made to the data. For example, when a query seeks records meeting multiple selection criteria, the process of assembling the results may be made substantially more efficient by applying the selection criteria in an appropriate order. Ordering is important because the process of scanning a database for matching records is time consuming.

For example, consider a database table (otherwise known as a relation) including columns (otherwise known as attributes) identifying vehicle owners by name and address, and the make, model, model year and other information about their vehicles. An exemplary query into such a relation may seek rows (otherwise known as tuples) identifying the following attribute values: surname "Smith", city name "New York", and vehicle manufacturer "Packard"; that is, seeking New Yorkers named Smith who own Packard vehicles. This query involves forming the intersection or "AND" of the results of three selection criteria, "Smith", "New York", and "Packard". However, two of these three criteria are likely to produce a large number of intermediate results—specifically, the surname "Smith" is popular in the United States, and a large number of individuals reside in "New York". However, "Packard" is a relatively rare vehicle manufacturer. Therefore, this query would be most efficiently performed by selecting those rows having the value "Packard" for the vehicle manufacturer attribute, which will be a relatively small set, and then identifying those rows that also have the surname "Smith" and city "New York". A far less efficient approach would be to identify all persons with the surname "Smith" or addresses in the city "New York", and then selecting from either large set those rows meeting the remaining selection criteria.

To attempt to optimize query processing, modern database software often generates statistics prior to executing a query, to estimate the likely size of the solution sets that will be generated from each selection criterion in a query. One way of forming these statistics is from indexes such as the encoded vector index (EVI), disclosed U.S. Pat. No. 5,706,495, Chadha et al., Jan. 6, 1998, "Encoded-Vector Indices For Decision Support and Warehousing", which is incorporated by reference. Other forms of indexes are used in other circumstances, as is found to be efficient for the particular type of data in use. Typically, statistics are generated using an index and the specific selection criterion of the query being processed. For example, in the above case a statistic would be generated indicating the approximate number of rows having a surname of "Smith", a city of "New York", and a manufacturer of "Packard". These statistics would ideally show that "Packard" is the most selective criterion and should be used first.

After collecting the needed statistics for a given query, those statistics may be cached for later re-use. For example, subsequent queries reusing the selection criterion of the city of "New York", could re-use the statistic previously generated for that same criterion. However, in order to re-use statistics, those statistics must be validated for the criterion with which they are to be used. The number of rows having a city name of "Brainerd" might be substantially less than the number having a city name of "New York". Thus, statistics generated for a first selection criterion on a given attribute, cannot be reused for a second selection criterion but rather must be re-validated by re-accessing the associated index. Unfortunately, the time required to access indexes to generate statistics can be a substantial fraction of total query optimization time; thus, re-validation of statistics represents a substantial loss of efficiency in database processing.

It will be appreciated that indexes may be single-dimensional or multi-dimensional. Thus, in the above example, there may be an index formed over both the surname and city attributes, in which case the query optimizer can generate an accurate statistic for the number of rows that will meet the criteria for both the surname and city set forth in a query. In the absence of a multi-dimensional index of this kind, the query optimizer will need to estimate, from the number of records with the surname "Smith", and the number of records with the city "New York", the number of records that will meet both criteria, which is typically done by assuming that the same proportion of persons in "New York" are named "Smith" as there are persons named "Smith" in the database as a whole. The resulting statistic is only as accurate as the underlying assumption that the distribution of persons named "Smith" is roughly similar for all cities. Another way to state this assumption, is that there is no correlation between the surname and city attributes, or that these attributes are "independent". Unfortunately, an assumption of independence of attributes is often incorrect. For example, surname and city are not likely to be independent (because surnames are often reflective of ethnic heritage, and cities have varied ethnic backgrounds). When there is a correlation between attributes of a database, statistics generated using an assumption of independence of those attributes will not be accurate. In such cases, a multi-dimensional index will prove useful, in that statistics formed using a multi-dimensional index for those attributes, will be more accurate than those formed using separate one-dimensional indexes.

Highly correlated attributes raise particular difficulties. Specifically, records in the exemplary database discussed above, may include a vehicle manufacturer and vehicle model attribute. These fields will be highly correlated, in that vehicle model names are typically used by a single manufacturer. For example, the model name "Escort" has been used by the manufacturer "Ford" whereas the model name "Camry" has been used by the manufacturer "Toyota". Such strong correlation will lead to dramatic over- or under-estimation of statistics by a query optimizer. A query optimizer generating statistics for a query seeking vehicles manufactured by "Toyota", and named "Camry", will dramatically underestimate the number of results if those attributes are assumed to be uncorrelated. A query optimizer generating statistics for a query seeking vehicles manufactured by "Toyota" or vehicles named "Camry", will dramatically overestimate the number of results if those attributes are assumed to be uncorrelated. Further information on these issues can be found in U.S. Pat. No. 5,995,957, Beavin et al., Nov. 30, 1999, "Query Optimization Through the Use of Multi-column Statistics to Avoid the Problems of Column Correlation", which is incorporated by reference.

While the above demonstrates the usefulness of multi-dimensional indexes, it is often not practical to form multi-dimensional indexes for every possible combination of attributes that might be used in a query, because the resources consumed in generating and storing the indexes will exceed the efficiencies achieved through their use. For this reason, in the past methods have been used to identify attribute sets that are likely candidates for inclusion in a multi-dimensional index. For example, one known method is to monitor the queries that use multiple attributes from a single relation, to identify attribute pairs that are frequently used together, so that multi-dimensional indexes may be formed on these attributes. For further details on this method, see U.S. Pat. No. 5,899,986, Ziauddin, May 4, 1999, "Methods for Collecting Query Workload Based Statistics on Column Groups Identified by RDBMS Optimizer", which is incorporated herein by reference. Unfortunately, this method may form multi-dimensional indexes on attributes that are independent merely because they are often used together in queries, while not forming indexes on attribute pairs that have high correlation simply because they are used infrequently together. Thus, this method has limited value in increasing the efficiency of queries.

Accordingly, new ways to use statistics and to identify appropriate attributes for multi-dimensional indexes, are needed in order to continue to provide significant improvements in query performance; otherwise, database users will be hampered in their ability to maximize intelligent information retrieval.

SUMMARY OF THE INVENTION

In accordance with principles of the present invention, these needs are met through the use of a method for revalidating previously generated statistics generated for an attribute. Specifically, in processing a query including a selection criterion on one or more attributes of a relation, a prior statistic generated for a prior different selection criterion on the same one or more attributes of the relation, may be revalidated for use in processing the query, based upon a measure of the entropy of the one or more attributes of the relation. In this way, the re-validation of statistics may be performed more efficiently.

In the described embodiment, a measure is generated for the entropy of the one or more attributes of a relation, by collecting a sample of tuples of the relation, and computing the frequencies of different values for the attributes in the sample, and then combining the measured frequencies into a measure of the entropy of the attributes.

In a second aspect, the invention features a method for identifying an attribute groups of a relation for which multi-dimensional indexes are to be formed, by evaluating the correlation of attribute values within tuples of the relation and determining that the correlation of attribute values within tuples of the relation exceeds a threshold.

In the described embodiment, a measure for the correlation of an attribute group is formed by comparing, for a common set of tuples, the sum of individual entropies of values of each attribute, to the joint entropy of the values of all attributes. The margin by which the sum of individual entropies of values of each attribute exceeds the joint entropy of the values of all attributes, for the same tuples, represents the information gain or amount of correlation in the group of attributes. The attribute groups that are found to have correlation are then evaluated to identify whether (a) specific attribute sub-group(s) are the primary source of correlation. This is achieved by comparing the information gain for the group of attributes, to the largest information gain of any sub-group of one fewer of the same attributes, over the same set of tuples. The margin by which the information gain of a group of attributes exceeds the largest information gain of any sub-group of one fewer of the same attributes, represents the mutual information gain of that group of attributes. A multi-dimensional index can then be formed for those attribute groups that are determined to have a substantial information gain and a substantial mutual information gain, thus indexing the smallest attribute groups in which correlation is identified. These groups may be found by an exhaustive search of all combinations of attributes of a relation, or alternatively by sampling a set of attribute groups and then evaluating other related groups of those found to have substantial correlation.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF SPECIFIC EMBODIMENTS

Figure 1:
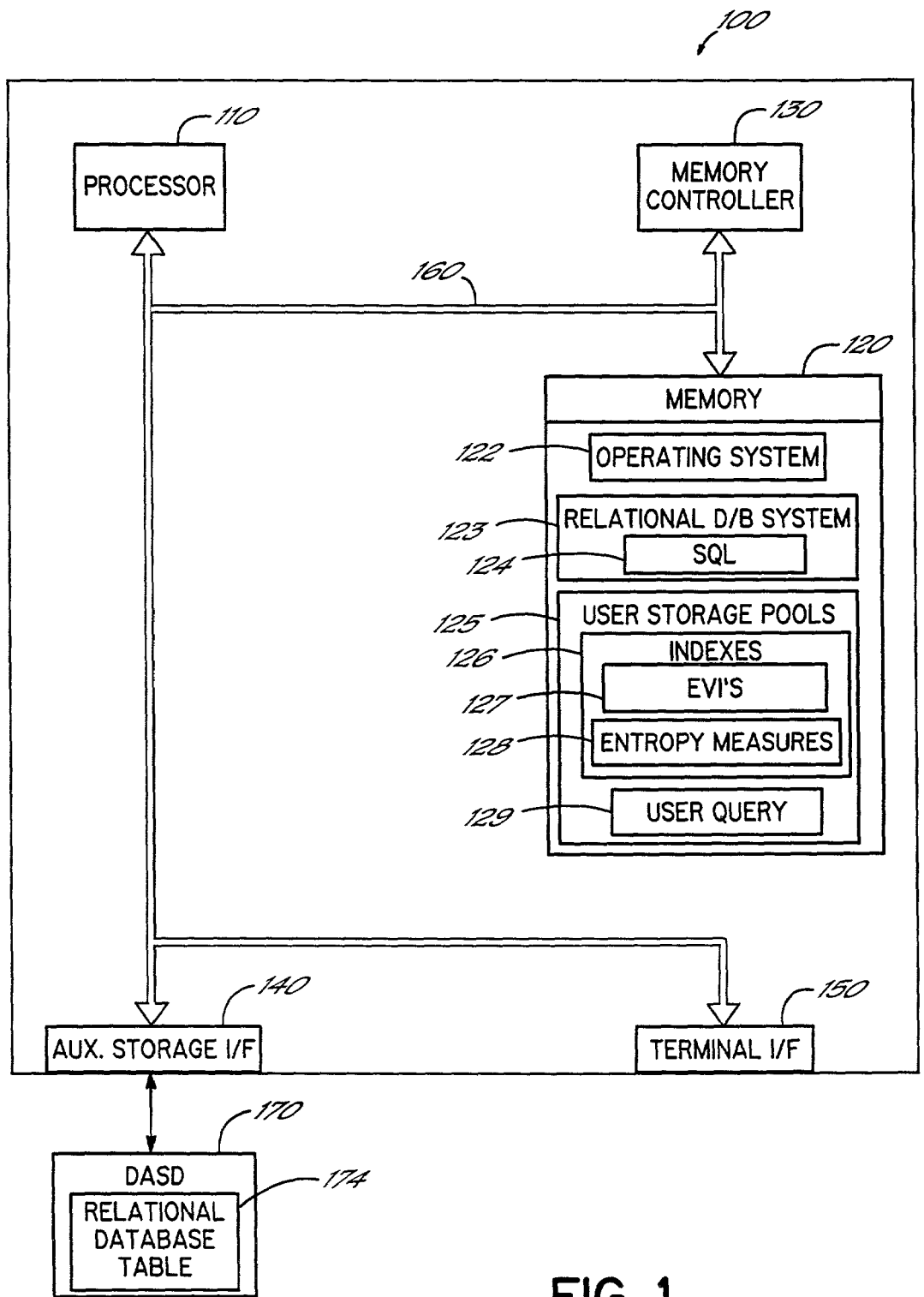
FIG. 1 is a block diagram of a computer system managing a database according to an embodiment of the present invention.

The methods of the present invention employ computer-implemented routines to query information from a database. Referring now to FIG. 1, a block diagram of a computer system which can implement an embodiment of the present invention is shown. The computer system shown in FIG. 1 is an IBM AS/400; however, those skilled in the art will appreciate that the method and apparatus of the present invention apply equally to any computer system, regardless of whether the computer system is a complicated multi-user computing apparatus or a single user device such as a personal computer or workstation. Thus, computer system 100 can comprise other types of computers such as IBM compatible personal computers running OS/2 or Microsoft's Windows. Computer system 100 suitably comprises a processor 110, main memory 120, a memory controller 130, an auxiliary storage interface 140, and a terminal interface 150, all of which are interconnected via a system bus 160. Note that various modifications, additions, or deletions may be made to computer system 100 illustrated in FIG. 1 within the scope of the present invention such as the addition of cache memory or other peripheral devices. FIG. 1 is presented to simply illustrate some of the salient features of an exemplary computer system 100.

Processor 110 performs computation and control functions of computer system 100, and comprises a suitable central processing unit (CPU). Processor 110 may comprise a single integrated circuit, such as a microprocessor, or may comprise any suitable number of integrated circuit devices and/or circuit boards working in cooperation to accomplish the functions of a processor. Processor 110 suitably executes a computer program within main memory 120.

Auxiliary storage interface 140 allows computer system 100 to store and retrieve information such as relational database table or relation 174 from auxiliary storage devices, such as magnetic disk (e.g., hard disks or floppy diskettes) or optical storage devices (e.g., CD-ROM). As shown in FIG. 1, one suitable storage device is a direct access storage device (DASD) 170. DASD 170 may alternatively be a floppy disk drive which may read programs and data such as relational database table 174 from a floppy disk. In this application, the term "backing storage" will be used to collectively refer to all types of storage devices, including disk drives, optical drives, tape drives, etc. It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., a floppy disk) and CD ROMS, and transmission type media such as digital and analog communication links, including wireless communication links.

Memory controller 130, through use of a processor is responsible for moving requested information from main memory 120 and/or through auxiliary storage interface 140 to processor 110. While for the purposes of explanation, memory controller 130 is shown as a separate entity, those skilled in the art understand that, in practice, portions of the function provided by memory controller 130 may actually reside in the circuitry associated with processor 110, main memory 120, and/or auxiliary storage interface 140.

Terminal interface 150 allows system administrators and computer programmers to communicate with computer system 100, normally through programmable workstations. Although the system 100 depicted in FIG. 2 contains only a single main processor 110 and a single system bus 160, it should be understood that the present invention applies equally to computer systems having multiple buses. Similarly, although the system bus 160 of the embodiment is a typical hardwired, multidrop bus, any connection means that supports-directional communication in a computer-related environment could be used.

In the illustrated embodiment, memory 120 suitably includes an operating system 122, a relational database system 123, and user storage pools 125. Relational database system 123 includes structured query language (SQL) 124, which is an interactive query and report writing interface. Those skilled in the art will realize that SQL 124 could reside independent of relational database system 123, in a separate memory location.

User storage pools 125 include indexes 126 such as an encoded vector index (EVI) 127, and entropy measures 128 developed in accordance with principles of the present invention, as well as storage for temporary data such as a user query 129. EVI 127 is one example of various forms of index that might be utilized. An EVI includes a symbol table and an EVI vector, as described in the above-referenced U.S. Patent. User query 129 is a request for information from relational database table 174 stored in DASD 170. The methods of the present invention do not require that the entire relational database table be loaded into memory 120 to obtain the information requested in user query 129. Instead, indexes are loaded into memory 120 and provides relational database system 123 an efficient way to obtain the information requested by user query 129.

It should be understood that for purposes of this application, memory 120 is used in its broadest sense, and can include Dynamic Random Access Memory (DRAM), Static RAM (SRAM), flash memory, cache memory, etc. Additionally, memory 120 can comprise a portion of a disk drive used as a swap file. While not explicitly shown in FIG. 1, memory 120 may be a single type of memory component or may be composed of many different types of memory components. For example, memory 120 and CPU 110 may be distributed across several different computers that collectively comprise system 100. It should also be understood that programs in memory 120 can include any and all forms of computer programs, including source code, intermediate code, machine code, and any other representation of a computer program.

Users of relational database system 123 provide requests for information in a useful form by creating user query 129. User query 129 is a way to ask relational database system 123 to provide only the set of information from relational database table 174 that meets certain criteria. Structured Query Language (SQL) 124 is the standard command language used to query relational databases. SQL commands are entered by a user to create user query 129, which then typically undergoes the following front-end processing by relational database system 123. User query 129 is parsed for syntax errors. The relational database table from where the user wants his information is identified. The field name(s) associated with the information are verified to exist in the relational database table. And, the SQL commands in user query 129 are reviewed by optimization software in relational database system 123 to determine the most efficient manner in which to process the user's request.

The front-end optimization processing of user query 129 by relational database system 123 determines whether a particular encoded vector index (EVI) 127 exists that might scan more efficiently than another database index or than the relational database housed in DASD 170. In order for an EVI to be useful to the methods of the present invention, the EVI must be built over the database fields specified by the criteria in user query 129. That is, there must be an EVI index for those particular fields in that particular database. Fields that are indexed are called EVI fields in the EVI. If an EVI with the appropriate EVI fields exists, relational database system 123 will opt to perform an indexed scan of that EVI, instead of a scan of some other traditional database index, or a scan of relational database table 174 itself.

The field of relational database 174 mapped by EVI 127 is called an EVI field. Sometimes, an EVI can be built over more than one database field. In this case the EVI fields include a leading EVI field, and one or more secondary EVI fields. Then, the information stored in EVI 127 is hierarchically indexed first by the leading EVI field, and further by one or more secondary key fields.

Figure 2:
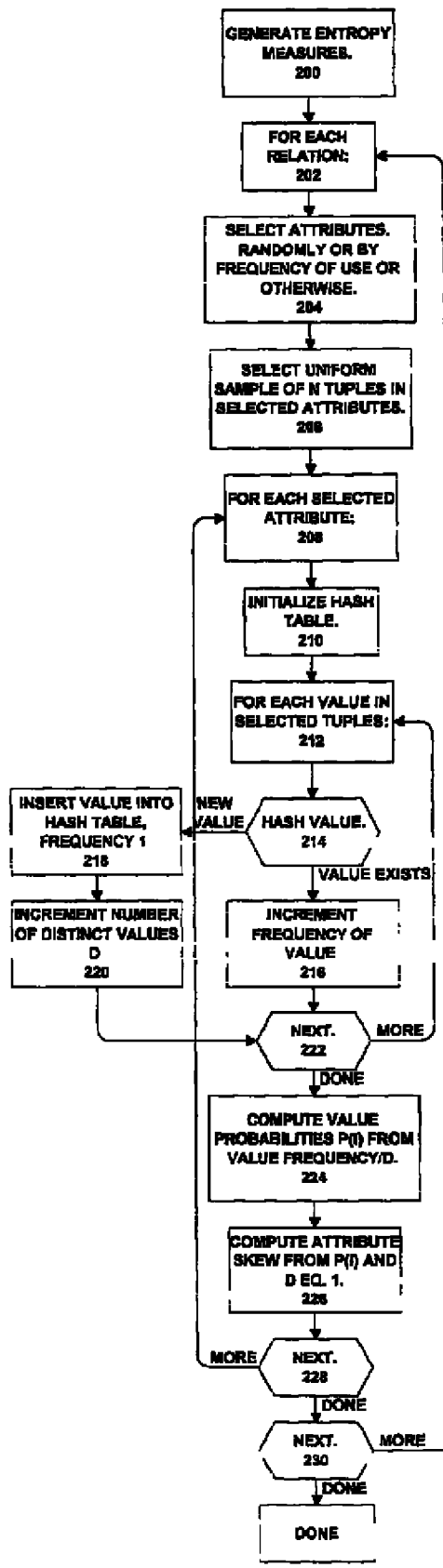
FIG. 2 is a flow chart of a process for generating entropy measures for individual or joint attributes in relations of a database.

Referring to FIG. 2, the process for generating entropy measures to be used in accordance with principles of the present invention can be explained. In this process 200, values for attributes are evaluated, for each relation for which entropy measures are being generated. Thus, in step 202 for each relation for which entropy measures are being made, in step 204, individual attributes or attribute spaces (groups) are selected to be measured. Attributes may be selected randomly or may be selected according to the frequency of use of those attributes in queries or through any other suitable procedure.

Next, an entropy value is computed for each attribute or attribute space in a sequence of steps starting at step 204. In step 206 a uniform sample of N tuples in the current relation is selected. This uniform sample is of sufficient size to be statistically representative of the attribute values for all tuples in the relation. Typically a small sample of rows is sufficient to create a reasonably accurate characterization of the entire data set. The objective of the sample is to create reasonably accurate estimates of entropy in the entire data set. For this application, a table is sampled, by collecting a uniformly random sample of rows. For a very large table, a sample of 2000 rows is sufficient for characterizing the entire table. The sampled rows are then sorted based upon the attribute to be indexed, according to a sort order, such as a typical alphanumeric ordering. Then, a histogram is created for the values in each column (attribute) in the table that is to be indexed. After selecting the sample, then in step 208, for each selected attribute or attribute space, a process is performed compute an entropy value for that attribute or space. Specifically, in step 210, a hash table is initialized for storing frequency values in the subsequent steps. Next, in step 212, for each value for the current attribute or set of values in the attribute space in the selected tuples, a hash function is used (step 214) on the attribute value or value set. If the result of the hash function in step 214 does not exist in the hash table, then in step 218 the value is inserted in to the hash table, with a frequency of one. Next, in step 220, the number of distinct values in the hash table, represented by the variable D, is incremented. If in step 214 the hash value already exists in the hash table, then in step 216 the frequency of that value of the hash table is incremented.

After step 220 or step 216, the next value or value set for the selected attribute or space is selected in step 222, and processing then returns to step 212 unless all values have been processed. After all values for the selected attribute or space have been processed, value probabilities, represented by the symbol P(i), are computed in step 224, from the value frequencies in the hash table. Specifically, each frequency is divided into the number of distinct values D, to produce a probability P(i) for that value. Next, in step 226, the attribute skew for the attribute, representative of the entropy of the attribute values, is computed from the probabilities P(i) and D using $$Skew = \frac{\sum P(i)\log[P(i)]}{\log(D)} \quad (1)$$

After computing attribute skew in accordance with Equation 1, in step 228 the next attribute or attribute space in the current relation is selected, and processing returns to step 208. When all attributes and attribute spaces in the current relation have been evaluated, then in step 230, the next relation is selected and processing returns to step 202. After all relations have been processed, the generation of entropy measures is done.

It will be noted that entropy measures will be accurate for a limited time period subsequent to their generation, if the database is being actively modified. Therefore, the process of FIG. 2 may be repeated on an ongoing basis, at least for those relations which have encountered frequent modifications, to maintain accurate entropy measures for each attribute of interest.

As described above, it is an aspect of the present invention to evaluate one or more relations to determine which attributes of those relations may be most effectively indexed to facilitate the future execution of queries on those relations. There is a large number of potential combination of attributes in a relation with n attributes. Specifically, the number of combinations S(n) of two or more attributes of an n-dimensional relation, is computed in Equation 2.

$$S(n) = c_n{}^n + c_1{}^n + c_2{}^n + \ldots + c_{n-2}{}^n = 2^n - (n+1) \quad (2)$$

Figure 3A:
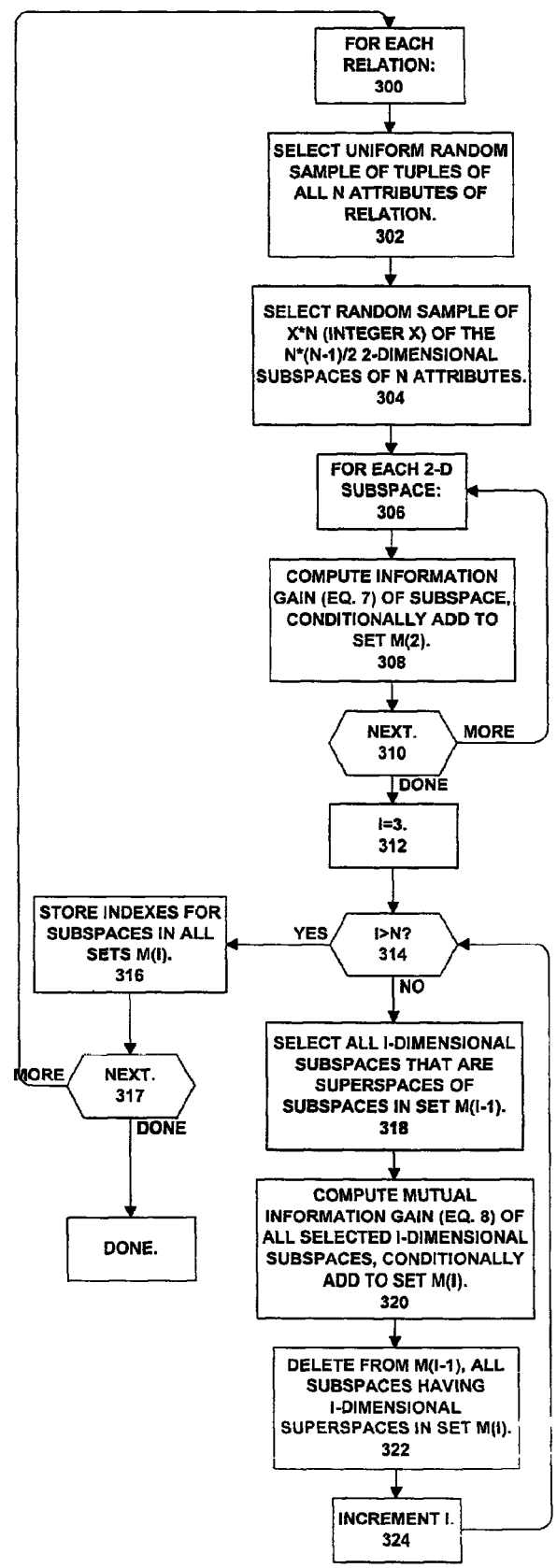
FIG. 3A is a flow chart of a process of evaluating spaces and subspaces of attributes in a relation to identify those that are recommended for indexing.

As can be seen, the number of combinations S(n) of attributes in a relation, is related exponentially to the number of attributes n. It is therefore important to identify, within this large set of possible spaces, those combinations of attributes which should be indexed to facilitate future execution of queries. A process for identifying attribute sets that can be usefully indexed is illustrated in FIG. 3A discussed below. To understand the theoretical basis for this process, begins with understanding the relationship between the entropies of individual attributes and joint entropies of multiple attributes. Specifically, the joint entropies of attributes $x_1, \ldots, x_n$ is related to the individual entropies of those attributes as set forth in equation 3.

$$H(x_1, \ldots, x_n) \le \sum_{i=1}^{n} H(x_i) \quad (3)$$

Equation 3 illustrates that entropy values for individual attributes will be equal to the joint entropy of those attributes, only if each of the attributes is uncorrelated with the others. If there is some correlation between the attributes $x_1$ then the sum of the entropy values of all of the attributes will be larger than the joint entropy value for the collected attributes.

From this, the process of FIG. 3A has been devised. The process of FIG. 3A seeks to identify those spaces or sets of attributes exhibiting substantial correlation, as determined by the difference between the individual attribute entropies and the joint entropies of those attributes when taken together.

The theorem of Equation 3 is used in conjunction with the following lemma: if a space of attributes exhibits correlation, then every superspace of that space will also exhibit correlated. This lemma is useful in developing the process of FIG. 3A, in that it permits conclusions regarding the correlation of a space, to be used to identify superspaces of that space that need to be evaluated for correlation.

This lemma can be proved by beginning with the assumption that the lemma is incorrect for a given space, and demonstrating that this assumption leads to a contradiction. Specifically, assume that $X_1$ through $X_{n-1}$ and $X_n$ are not correlated, but $X_1$ through $X_{n-1}$ are correlated. If so, then from Equation 3 we know that $$H(X_1, \ldots X_{n-1}) < \sum_{i=1}^{n-1} H(X_i) \quad (4)$$

Equation 4 states that the joint entropy of the gathered set of attributes of $X_1$ through $X_{n-1}$ must be less than the sum of the individual entropies of those attributes, which follows from the assumption that $X_1$ through $X_{n-1}$ are correlated.

Next, the entropy of attribute $X_n$ is added to both sides of Equation 4, yielding $$H(X_1, \ldots X_{n-1}) + H(X_n) < \sum_{i=1}^{n} H(X_i). \quad (5)$$

Next, the left side of Equation 5 can be substituted based upon Equation 3, because $X_1$ through $X_n$ are assumed to be uncorrelated. This substitution gives $$H(X_1, \ldots X_n) = H(X_1, \ldots X_{n-1}) + H(X_n) < \sum_{i=1}^{n} H(X_i) \qquad (6)$$

Equation 6, however, is contradictory for the reason that $X_1$ through $X_n$ are assumed to be uncorrelated, and therefore both expressions to the left of the inequality of Equation 6 should be equal to the expression to the right of the inequality, and not unequal. Thus, the lemma is established.

The process of FIG. 3A relies upon two rules used to prune subspaces from the set of subspaces of a relation. First, the degree of correlation of a space of attributes, measured as the mutual information I between those attributes, is used to select subspaces of potential interest for indexing.

$$I(X_1; \ldots ; X_n) = \sum_{i=1}^{n} H(X_i) - H(X_1, \ldots, X_n) > a \qquad (7)$$

Equation 7 illustrates computation of the mutual information of attributes $X_1$ through $X_n$. The threshold value a in Equation 7 sets the amount of information correlation in the set of attributes $X_1$ through $X_n$ that must be found to consider those attributes as potential candidates for indexing. Attributes will considered to be significantly correlated only if the mutual information of those attributes is substantial. The threshold value a is selected empirically, based upon results with actual data, and a tradeoff between the size and the usefulness of the index.

The lemma proved above, shows that when a space is correlated, this implies that its superspaces are also correlated. Thus, it may be that a correlated space has a superspace that is even more strongly correlated, in which case, an index on the superspace would be of more use. To facilitate the identification of such situations, a second rule is provided, to compute the mutual information gain I between an n dimensional space and its n−1 dimensional subspaces.

$$I(x_1, \ldots, x_{n-1}, x_n) = I(x_1, \ldots ; x_n) - \text{Max}(I(x_{I_1}; \ldots ; x_{I_{n-1}})) > b \qquad (8)$$

A space is considered significantly correlated and recommended for indexing, if the space has a mutual information that meets the inequality of Equation 7, and its superspaces are not found to have a significant mutual information gain, meaning those superspaces do not satisfy the inequality of Equation 8. The use of these two rules to evaluate possible attribute combinations is described in FIG. 3A.

Referring now to FIG. 3A, a process for identifying attribute groups of a relation for which multi-dimensional indexes are to be formed, can be explained. This process includes a sequence of steps beginning at step 300, which are carried out for each relation of a database to be indexed. In a first step 302, a uniform random sample of tuples of the relation is selected. This random sample includes tuples with all N attributes for the current relation. This random sample is used to make predictions regarding the correlation of data within the attributes of the relation, and should therefore be large enough to have reasonable statistical likelihood to predict the correlation of all tuples in the relation as a whole.

To begin to identify groups of attributes (or attribute "spaces") that have substantial correlation, in step 304 a random sample of the 2-dimensional subspaces of the relation is selected. For a relation with N attributes, the number of possible 2-dimensional subspaces is equal to the number of unique combinations of N attributes taken two at a time, which is equal to N*(N−1)/2. A random sample of these 2-dimensional subspaces is selected in step 304, with the sample size chosen based upon the desired accuracy of the process, and the available computational resources for performing the process of FIG. 3B. The size of the random sample may be chosen to be a multiple of the size of the relation, i.e., there may be X*N spaces selected for some positive integer value of X.

When the sample of 2-dimensional spaces has been selected, a sequence of steps beginning with step 306 is performed for each 2-dimensional subspace. These steps include computing the information gain for the subspace, and if the information gain for the subspace exceeds a threshold value, adding the subspace to a result set M(2). The computation of information gain and comparison to the threshold value a, is set forth in Equation 7, above. After computing the information gain for a space, and conditionally adding to result set M(2), the next space is selected in step 310, so that step 308 is repeated for each subsequent subspace.

After all 2-dimensional subspaces have been evaluated in step 308, then a loop variable I is initialized in step 312 to a value of 3. The loop variable I identifies "passes" through the sequence of steps 314, 318, 320, 322 and 324, which evaluate in the Ith pass, (I−1)-dimensional and I-dimensional subspaces, to determine which candidate (I−1)-dimensional subspaces in result set M(I+1) should be indexed, and which i-dimensional subspaces are candidates for indexing to be included in result set M(I). The process of these steps is performed for each value of I from 3 to N, the number of attributes in the relation. When in step 314, I reaches the value of N, then all subspaces have been evaluated, and in step 316 indexes are generated for all of the subspaces that are identified in all of the sets M(I) generated by the proceeding steps. At this point, indexing for a relation is completed and the next relation is selected in step 317. After all relations have been indexed, the process of FIG. 3A is completed.

To evaluate candidate spaces from (I−1)-dimensional subspaces to evaluate I-dimensional subspaces, a first step 318 is performed in which all I-dimensional subspaces that are superspaces of those subspaces in the set M(I−1) are selected. Thus, all superspaces that include at least the attributes in the current interim result set M(I−1) from the previous "pass" are selected. Next in step 320, Equation 8 is used to compute the mutual information gain of all the selected I-dimensional subspaces. Those subspaces that meet the mutual information gain threshold b provided by Equation 8, are conditionally added to the interim solution set M(I). The value for b is selected empirically, based upon results of different values of b on actual data sets, and a tradeoff between index size and the usefulness of the index. When an I-dimensional superspace is added to the solution set M(I), this means that an index will be created for the corresponding attributes of that space, or for a superspace including those attributes and others. It will be appreciated that when an index that is created for a certain attribute group, that index can be used for queries directed to any or all of the attributes in the group. Therefore, it is not necessary to index any combination of attributes included within the attributes of an existing index. For this reason, in step 322 the set of spaces M(I−1) is reviewed, and all subspaces of the I-dimensional spaces added to set M(I) are deleted from M(I−1). This ensures that only a minimal number of indexes required are generated by the process of FIG. 3A.

After the steps 318, 320 and 322, the loop variable I is incremented in step 324 and processing returns to step 314 for an additional pass, or in the case that I=N, for completion procedures as described above.

Figure 3B:
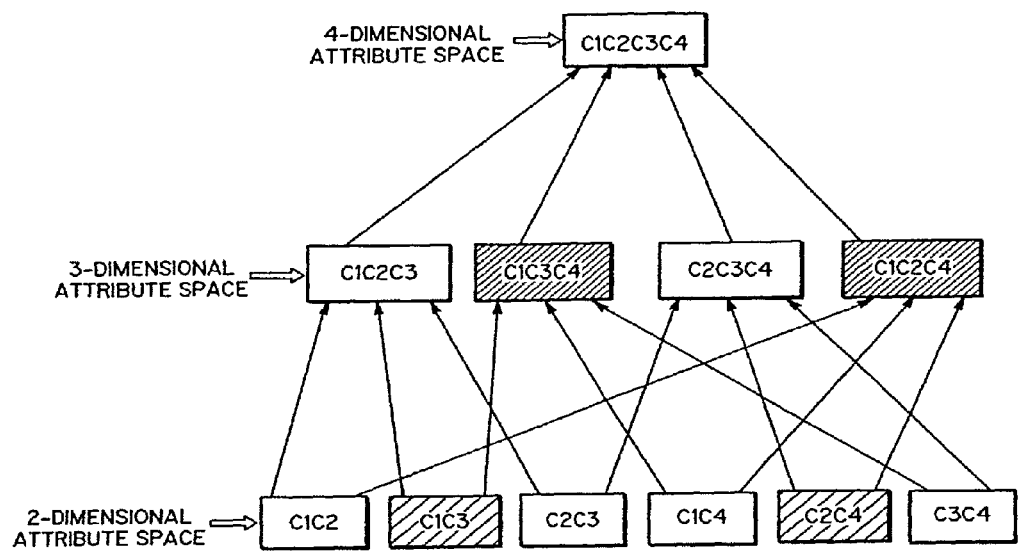
FIG. 3B is an illustration of the spaces evaluated by the process of FIG. 3A.

Referring now to FIG. 3B, an example can be used to illustrate the process of FIG. 3A. For this example, assume a relation with four attributes (columns) C1, C2, C3 and C4 respectively. The purpose of the process of FIG. 3A is to identify minimal set(s) of columns among those four columns that will best represent the correlations between the values in the columns. The entropy H for each individual column may be computed using the process of FIG. 2. H(C1) represents the entropy of column C1, and so on. For the purpose of this example, assume that H(C1)=0.4, H(C2)=0.6, H(C3)=0.5, and H(C4)=0.6.

The process of FIG. 3A starts by selecting a random sample of 2-dimensional spaces (i.e., groups of two columns). Assume that the sample will contain the following spaces (C1C3), (C2C3), (C1C4) and (C2C4). We can measure the entropy of these spaces using the method described in FIG. 2. Assume that H(C1C3)=0.2, H(C2C3)=1, H(C1C4)=0.9, and H(C2C4)=0.4. Now, for each of these spaces, in step 308 we apply Equation 7. For this, we will assume that a=0.2.

H(C1)+H(C3)−H(C1C3)=0.7>a.
H(C2)+H(C3)−H(C2C3)=0.1<a,
H(C1)+H(C4)−H(C1C4)=0.1<a, and
H(C2)+H(C4)=H(C2C4)=0.8>a.

Apparently, the strongly correlated 2-dimensional spaces are C1C3 and C2C4. These are provisionally stored in set M(2), and thus are shaded lightly in FIG. 3B.

Next, in step 318 of FIG. 3A, compute the entropy of 3-dimensional spaces that are superspaces of C1C3 and C2C4. Those superspaces are C1C2C3, C1C3C4, C2C3C4 AND C1C2C4. Let the entropy values of each superspace as follows:

H(C1C2C3)=0.7, H(C1C3C4)=0.3, H(C2C3C4)=0.8, and H(C1C2C4)=0.2.

Also, let b=0.3. Then, in step 320, we apply equation (8).

(H(C1)+H(C2)+H(C3)−H(C1C2C3))−(H(C1)+H(C3)−H(C1C3))=0.2<b,
(H(C1)+H(C3)+H(C4)−H(C1C3C4))−(H(C1)+H(C3)−H(C1C3))=0.4>b,
(H(C2)+H(C3)+H(C4)−H(C2C3C4))−(H(C2)+H(C4)−H(C2C4))=0.1<b, and
(H(C1)+H(C2)+H(C4)−H(C1C2C4))−(H(C2)+H(C4)−H(C2C4))=0.6>b.

From this, we conclude that the strongly correlated columns are C1C3C4 and C1C2C4, which are provisionally added to set M(3). Note that both of the spaces C1C3 and C2C4 in set M(2) have superspaces in M(3). This means that those spaces need not be indexed as their superspaces will be indexed; therefore, both spaces in set M(2) are deleted from M(2) in step 322. These spaces are not considered strongly correlated and therefore are not shaded darkly in FIG. 3B.

Next, the process of FIG. 3A begins to analyze 4-dimensional superspaces of the spaces in M(3), in this case limited to C1C2C3C4. In the example illustrated in FIG. 3B, C1C2C3C4 is assumed not to have a mutual information gain greater than the previously selected threshold b, and thus is not included in the set H(4). Because there are no superspaces of C1C3C4 or C1C2C4 in H(4), those two spaces remain in H(3) and are considered strongly correlated spaces. Thus, at the end of the process, the spaces C1C3C4 or C1C2C4 are identified as strongly correlated spaces for which indexes should be created. These spaces are therefore darkly shaded in FIG. 3B.

Figure 4:
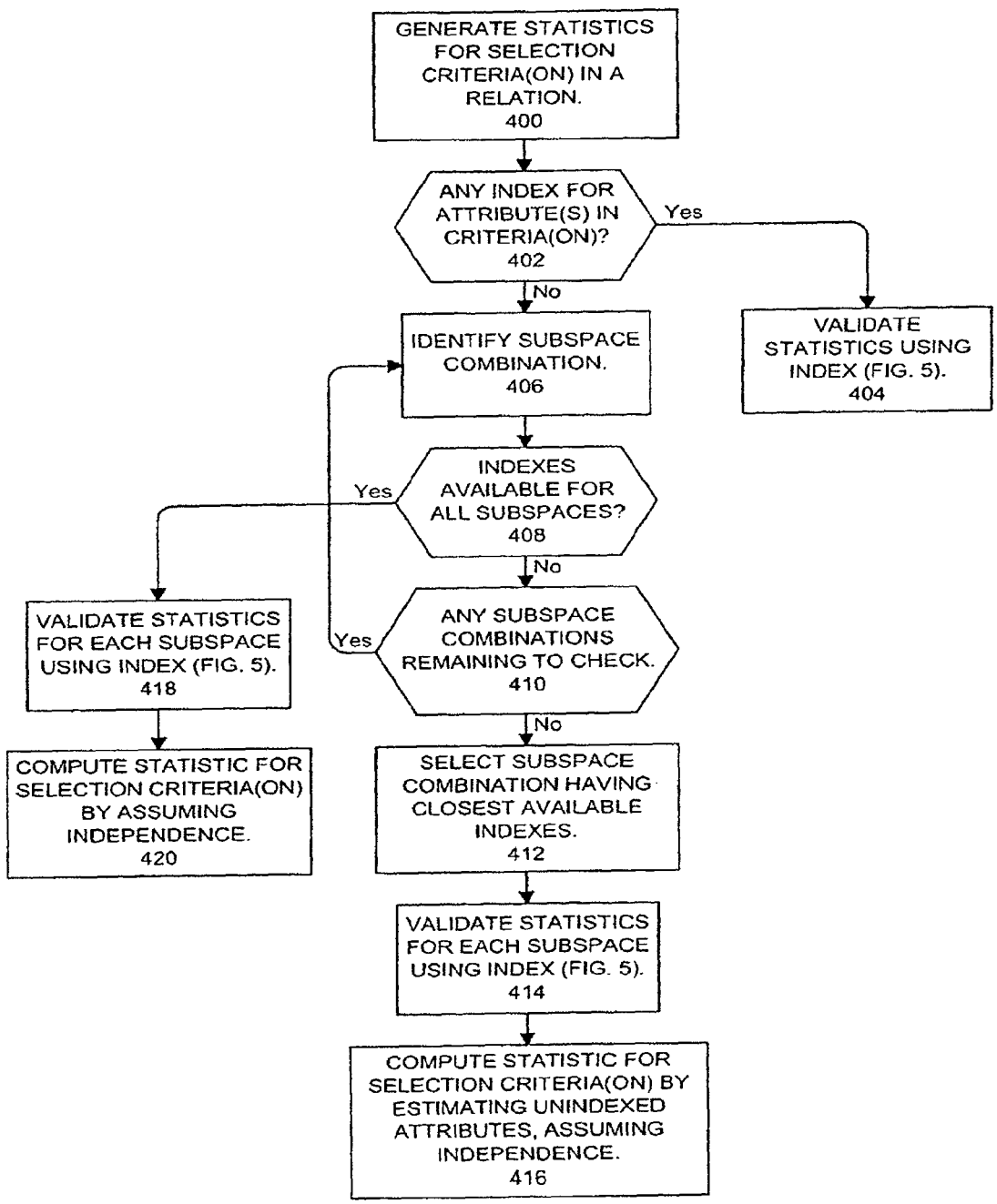
FIG. 4 is a flow chart of a process of generating statistics for selection criteria of a query acting upon a relation in a database.

Referring now to FIG. 4, a process 400 for generating statistics for a selection criterion or multiple criteria upon a relation can be discussed. In a first step 402, the criteria acting upon attributes of the relation are evaluated to determine whether an index is available for generating statistics for the criteria. It will be noted that criteria acting upon multiple attributes, such as requiring specific values for two or more attributes, can only be accurately statistically evaluated using an multi-attribute index that indexes all of the attributes referenced in the criteria. If there is an index including all of the attributes in the relation that are referenced in the criterion of interest, then processing can continue from step 402 to step 404, in which statistics are generated for the criterion using the index. Further details on this process are explored below with reference to FIG. 5.

If there is no index available referencing all of the attributes in the criteria under consideration, then processing proceeds from step 402 to step 406. Step 406 is the first of a series of three steps 406, 408 and 410 which are repeatedly executed, in an effort to identify a combination of indexes that can be used to generate statistics for the criteria. In this process, in step 406 a combination of two subspaces of attributes is identified, such that the two subspaces of attributes collectively include all of the attributes in the criteria under consideration. Next, in step 408, it is determined whether indexes are available for all of the subspaces in the combination identified in step 406, i.e., whether there is an index having all attributes for each subspace. If so, then in step 418, statistics are generated for the portion of the criteria applicable to each subspace, using the available indexes. The process of step 418 is explained in greater detail below with reference to FIG. 5. After generating statistics for subspaces in step 418, in step 420 a statistic is generated for the selection criteria as a whole, by assuming independence of the attributes in the different selected subspaces identified in step 406. For example, if two subspaces are identified, and using the indexes for those subspaces it is determined that one tuple in five will meet the portion of the criteria applicable on the first set of attributes, and one tuple in five will meet the criteria applicable on the second set of attributes, then in step 420, assuming independence of the attributes, one tuple in twenty-five should meet the combined requirements of the criterion if the criteria are joined by an AND operation. Alternatively, if the criteria on the two attribute are joined by an OR operation, then based upon the same statistics, and assumed independence, slightly less than two tuples out of every five (2/5-1/25) should meet the selection criteria.

In the case where indexes are not available for all subspaces in the current combination identified in step 406, then in step 410 it is determined whether there are any other subspace combinations that are yet to be examined for possible use in generating statistics for the selection criteria. If so, then processing returns to step 406 to identify one of the remaining subspace combinations and then proceed to step 408 to determine whether indexes are available for each of the subspaces in the newly identified combination.

If, however, all subspace combinations have been examined and there is no set of subspace combinations for which there is an existing index for each subspace, then processing proceeds from step 410 to step 412. In step 412, the subspace combination having the best available index(es) is selected. In step 412, the subspace combination that is selected, is the combination for which the greatest number of attributes are found in existing indexes. Amongst combinations that have an equal number of indexed attributes, the combination having the smallest number of indexes and/or greatest number of attributes in single index is selected. This selection process is designed to chose the subspace combination from which the most accurate statistics can be generated from the indexes that are in existence.

Figure 5:
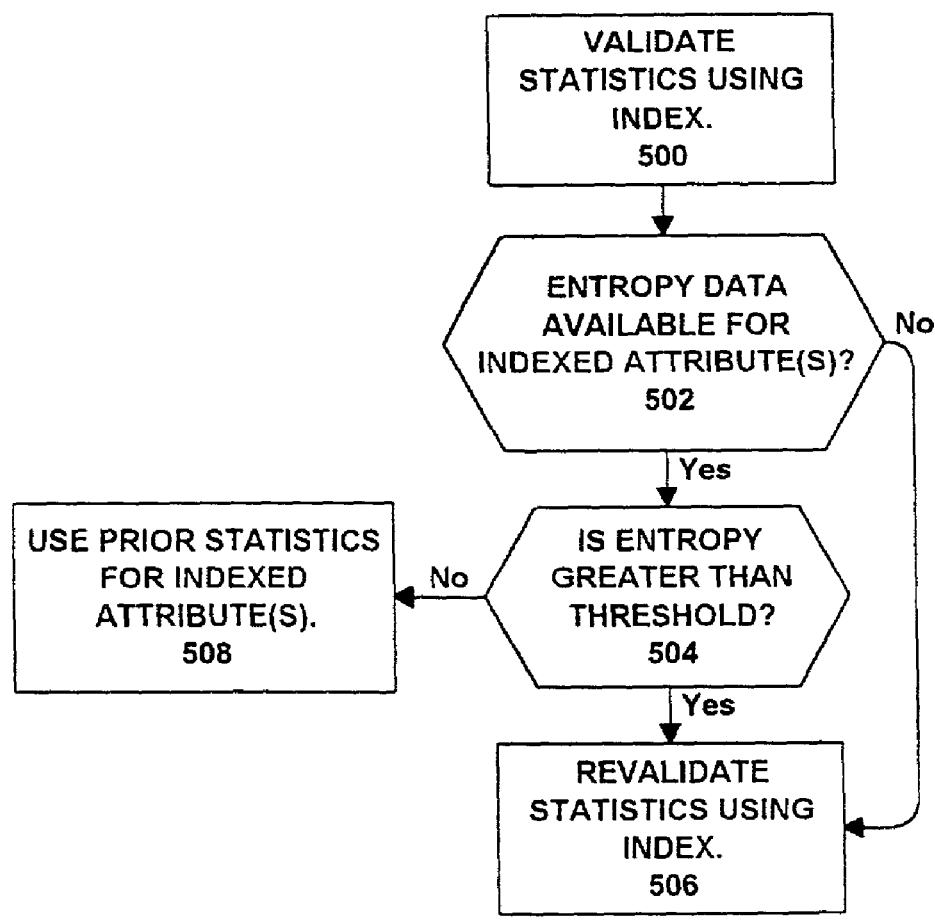
FIG. 5 is a flow chart of a process of revalidating statistics for a give selection criterion acting upon attributes of a relation.

After step 412, in step 414 statistics are generated for those selection criteria which do have indexes available for the identified attributes. Once again, this process is as illustrated in FIG. 5. After generating statistics for those selection criteria that can be estimated with an index, in step 416 a statistic for the complete set of criteria is generated by estimating statistics for those selection criteria acting upon unindexed attributes. For this step, an assumed selectivity may be utilized for an attribute, based upon historical experience or a database programmer's estimation of the selectivity of a typical criterion acting upon that attribute. The statistics generated using indexes are then combined with the estimated statistics, assuming independence of the attribute values as discussed above.

Referring now to FIG. 5, the process 500 for validating statistics for an indexed attribute can be explained. This process begins in step 502 by determining whether entropy data are available for the indexed attributes for which statistics are being generated. If so, then in step 504 it is determined whether the entropy for the indexed attribute or attributes is greater than a predetermined threshold value. The threshold value is selected empirically, based upon results with actual data, and a tradeoff between the delays associated with revalidating statistics for low-entropy data, and the inaccuracies and delays associated with reusing statistics for high-entropy data. If the entry exceeds the selected threshold in step 504, this indicates that the selectivity of a criterion applicable to that attribute has a substantial variance, and therefore statistics that have been previously generated for other attribute values will have little relation to statistics to be generated for the current selection criterion on the same attribute. Thus, in this situation, processing continues to step 506 in which the index available for the attribute is used to determine the number of tuples that will meet the selection criterion for which statistics are being generated. Processing also continues directly to step 506 if in step 502 no entropy data is available for the attribute value which is the subject of the selection criteria.

If, however, entropy data is available for the attribute that is the subject of the selection criterion for which statistics are being generated, and that entropy data shows that the entropy of the attribute is less than the threshold value of step 504, then statistics previously generated for the attribute in the criterion under consideration can be reused. Statistics may be reused in this way because the low entropy of the attribute values, indicates that the selectivity of attribute values within the relation does not vary substantially from one attribute value to another, and therefore statistics generated for a prior attribute value may be reused and revalidated for a current different attribute value without reaccessing the index. This use of prior attribute value statistics is a substantial advantage of principles of the present invention, because it reduces the computational burden of accessing the index for every revalidation of statistics.

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. For example, while the examples provided herein have been explained in the context of a database program implementing standard query language (SQL), the invention may be used in the context of a database program using any other declarative database language. The invention relates to implementation of a database program and is not limited to any particular end user language. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A computer-implemented method for revalidating previously generated statistics for a query directed to one or more attributes of a relation, comprising
identifying in said query a selection criterion on said one or more attributes of said relation, and
revalidating a prior statistic generated for a prior different selection criterion on the same one or more attributes of said relation, based upon a measure of entropy of said one or more attributes of said relation.

2. The method of claim 1 wherein said prior statistic is revalidated if a measure of entropy of said one or more attributes of said relation is less than a predetermined threshold value.

3. The method of claim 1, further comprising generating a measure for the entropy of said one or more attributes of said relation, by the steps of
computing frequencies of different values for the one or more attributes in tuples of the relation, and
combining the measured frequencies into a measure of the entropy of the attributes.

4. The method of claim 3, wherein generating a measure for the entropy of said one or more attributes of said relation further comprises collecting a sample of tuples of the relation, wherein frequencies of different values are computed for tuples in the sample.

5. The method of claim 3 wherein combining the measured frequencies comprises determining a number of distinct values for the one or more attributes, and converting the computed frequencies to probabilities by dividing the frequencies by number of distinct values.

6. The method of claim 5 wherein combining the measured frequencies further comprises forming a weighted sum of the computed probabilities.

7. A computer system implementing a relational database system and evaluating queries directed to said relational database, comprising
storage for said relational database, including a relation having a plurality of tuples including values for a plurality of attributes, and
computing circuitry performing query optimization and query execution upon said relational database, said query optimization including generating statistics for a query directed to one or more attributes of said relation, by identifying in said query a selection criterion on said one or more attributes of said relation, by revalidating a prior statistic generated for a prior different selection criterion on the same one or more attributes of said relation, based upon a measure of entropy of said one or more attributes of said relation.

8. A program product for implementing a relational database system and evaluating queries directed to said relational database, comprising
a relational database, including a relation having a plurality of tuples including values for a plurality of attributes, and relational database software performing query optimization and query execution upon said relational database, said query optimization including generating statistics for a query directed to one or more attributes of said relation, by identifying in said query a selection criterion on said one or more attributes of said relation, by revalidating a prior statistic generated for a prior different selection criterion on the same one or more attributes of said relation, based upon a measure of entropy of said one or more attributes of said relation, and a computer-readable storage media storing said relational database and relational database software.

* * * * *